Sept. 18, 1956 C. E. STERNBURGH 2,763,744
CIRCUIT DISCONNECTOR FOR MOTOR VEHICLES
Filed April 30, 1954
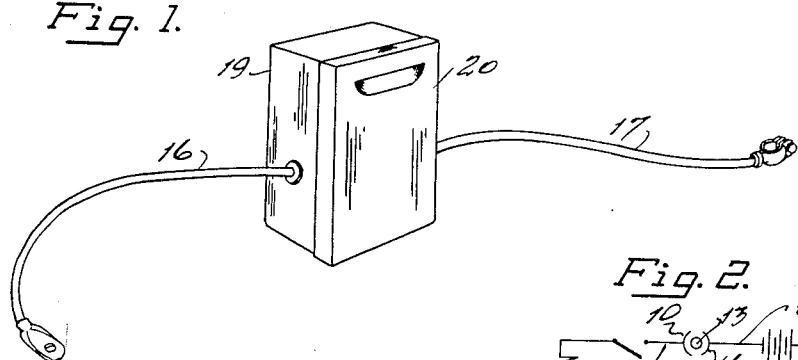
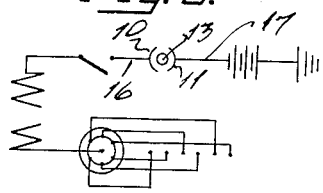
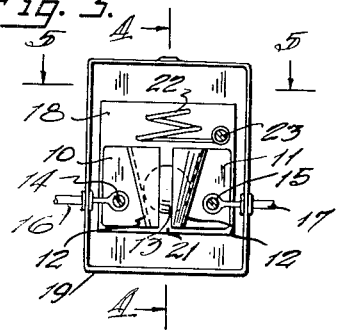
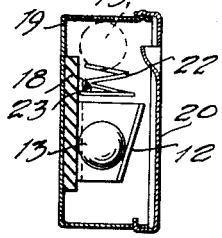
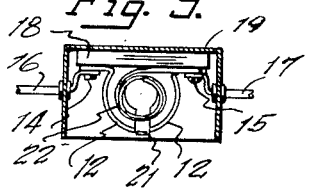
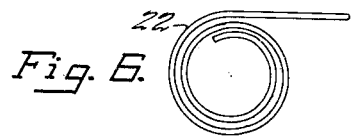
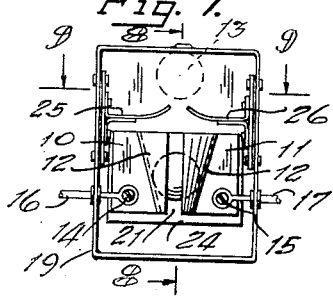
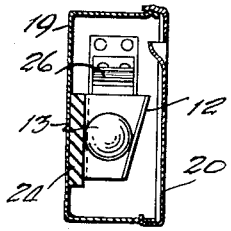
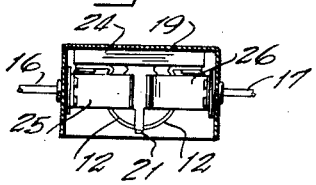
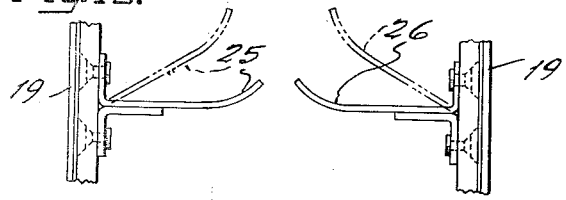
Charles E. Sternburgh
INVENTOR.
BY Cecil L. Wood
ATTORNEY United States Patent Office 2,763,744
Patented Sept. 18, 1956

2,763,744

CIRCUIT DISCONNECTOR FOR MOTOR VEHICLES

Charles E. Sternburgh, Fort Worth, Tex.

Application April 30, 1954, Serial No. 426,825

4 Claims. (Cl. 200—61.52)

This invention relates to circuit breakers of the type for interrupting an electrical circuit, and it has particular reference to apparatus which is capable of being installed in automotive electrical circuits whereby the source of electrical energy can be immediately shut off or interrupted automatically in the case of upset of the vehicle, and its principal object is to provide means whereby the source of electrical energy, as from a battery, can be promptly and effectively shut off to eliminate the hazard of fire in the event of upset or collision.

It is an object of the invention to provide, in an electrical circuit for automotive vehicles, a coupling or circuit connection which can be installed in a motor vehicle forwardly of the fire wall thereof, or concealed within a casing under the hood, through which the battery circuit can be directed, and in which a means is provided by which the circuit can be instantly broken and completely disconnected should the vehicle be accidentally turned over or upset so that the hazard of fire can be completely eliminated in such instances.

A further object of the invention resides in the provision of an electrical switch, or a circuit connector, comprising a ball of a conductive material which is capable of completing a circuit in the normal operation of the vehicle but, when the vehicle is upset, or turned to a critical angular position, the ball will be dislodged from its contact so as to permanently break the circuit, thus preventing fire damage and further providing a means for restraining the ball from reentering the receptacle provided therefor to complete the circuit until the device is manually operated.

Broadly, the invention contemplates the provision of apparatus by which the electrical circuit of an automotive vehicle can be completely broken and permanently in terrupted and providing suitable means whereby the circuit cannot be reconnected or re-energized until manually manipulated.

While the foregoing objects are paramount, other and lesser objects will become manifest as the description proceeds, taken in connection with the appended drawings wherein:

Figure 1 is a perspective view of a unitary enclosure for the invention, showing a battery cable extending therethrough.

Figure 2 is a diagrammatic illustration of an electrical circuit in which the invention is installed.

Figure 3 illustrates the invention as installed within a housing and adapted to be attached to the fire wall of a motor vehicle, showing the opposing complementary conductive plates connected into the battery circuit, and illustrating a means for preventing the ball circuit closure from reentering the device.

Figure 4 is a vertical sectional view on lines 4—4 of Figure 3.

Figure 5 is a lateral cross-sectional view on lines 5—5 of Figure 3.

Figure 6 illustrates, in plan, a conically coiled spring adapted to prevent a conductive ball from reentering the switch.

Figure 7 is a modified form of the device illustrated in Figure 3, showing a modified means for preventing the ball conductor from reentering the conical switch closure.

Figure 8 is a vertical cross-sectional view taken on lines 8—8 of Figure 7.

Figure 9 is a lateral cross-sectional view taken on lines 9—9 of Figure 7, and

Figure 10 is a fragmentary enlarged view of the flexible means for preventing the ball conductor from reentering the receptacle, as illustrated in Figures 7, 8 and 9.

One of the greater hazards in automotive accidents is that which results from fire generally ignited by energized electrical circuits in automotive vehicle when such vehicles are overturned, or upset, due to collision or through some means by which the same is rendered out of control by the operator so as to cause the same to be turned over, and when the automotive electrical circuits are permitted to be connected, or electrical energy is allowed to flow from the source, there is always the hazard of fire endangering the occupants and the vehicle.

It is an object of the invention, therefore, to automatically shut off or interrupt the electrical current flowing from the battery when the vehicle is upset or inclined beyond a safe angle, and affording a means whereby the ignition or electrical circuit of the vehicle can be interrupted or rendered inoperative by the discharge from a receptacle of a conductive ball which will completely shut off or interrupt the electrical circuit and be incapable of reenergization except by manual manipulation.

The invention, therefore, comprises a unit which consists of a pair of right- and left-hand plates 10 and 11, which are opposingly formed with curved flanges 12, capable of defining a conical receptacle for a ball 13 of conductive material, as illustrated in Figure 3. Each of the plates 10 and 11 have terminals 14 and 15 to which are connected sections 16 and 17 of a battery cable, as illustrated in Figure 1.

While various means may be provided for mounting the plates 10 and 11, it is contemplated that the same may be attached to an insulating plate 18 by which the members 10 and 11 are suitably insulated from the housing 19 in which the assembly is installed, as illustrated in Figures 3, 4 and 5. A suitable cover 20 is provided for the housing 19 which can be readily removed to gain access to the circuit-breaking assembly. It will be noted that there is a gap 21 between the plates 10 and 11, as apparent in Figure 3, which is broached by the ball 13. Immediately above the assembled plates 10 and 11 is arranged a conically coiled spring 22 which is secured by a screw 23 to the insulating plate 18, as shown in Figures 3 and 4. The spring 22 is yieldable so that when the ball 13 is discharged from the receptacle formed between the plates 10 and 11, it cannot return thereto voluntarily but must be replaced manually, and only after removing the cover 20 from the housing or casing 19.

In a modified structure, illustrated in Figures 7, 8, 9 and 10 the plates 10 and 11, while shown attached to an insulating member 24 secured to the back of the housing 19, have flexible guards 25 and 26 arranged thereabove, and secured to each side of the housing 19, which will permit the ball 13 to move out of the conical receptacle formed by the plates 10 and 11 but will close voluntarily to prevent the ball 13 from returning to the receptacle, thus maintaining the circuit open until the ball 13 is replaced within the receptacle to complete the circuit through the battery cable sections 16 and 17 which are connected to the plates 10 and 11. The members 25 and 26 may be of flexible metal or non-conductive material, as desired, such as rubber, or the like. As illustrated in broken lines in Figure 10, the members 25 and 26 can flex upwardly to permit the ball 13 to escape from the receptacle formed by the plates 10 and 11 to return to normal position, shown in solid lines in Figure 10, to prevent the ball from returning thereto.

Manifestly, various structural arrangements can be provided by which the results herein described can be accomplished without departing from the spirit and intent of the invention or the scope of the appended claims.

What is claimed is:

1. In a circuit breaker for automotive electric circuits, a pair of conductive plates connected in said circuit, each having a portion forming a part of a conical receptacle and spaced apart, an insulated mounting for said plates, a conductive ball adapted to repose in said receptacle and electrically join said plates to complete said circuit, and means comprising a spring to exclude said ball from said receptacle when removed therefrom.

2. In a device for breaking an automotive electrical circut, a pair of conductive plates connected into said circuit and having an insulated mounting and complementing each other in lateral spacing, the said plates having portions formed therewith defining right- and left-hand sections of a conical receptacle, a conductive ball adapted to repose in said receptacle to complete an electric circuit therebetween, and means associated with said receptacle to exclude said ball therefrom when the latter has been removed to break said circuit.

3. In an automotive circuit, apparatus for breaking the battery circuit of an automobile in the event of upset, a pair of opposingly formed conductive plates connected into said circuit and spaced apart to form a gap in said circuit, means formed with each of said plates defining sections of a receptacle, a conductive ball in said receptacle completing said circuit therethrough, the said ball being capable of removal from said receptacle when the latter is inverted to break said circuit, and means comprising a yieldable shield for excluding said ball from said receptacle until manually inserted therein to complete said circuit.

4. In a device for breaking an electrical circuit for automobiles, in combination with a battery conductor, a pair of conductor plates rigidly mounted in spaced relationship, each having a connection with a portion of said battery cable, a curved flange formed on each of said plates adapted to define a conical receptacle in opposing complementary arrangement, a ball of conductive material arranged in said receptacle to complete a circuit through said battery cable, and means associated with said plates excluding said ball from said receptacle when the same has been discharged therefrom.

References Cited in the file of this patent

UNITED STATES PATENTS

| 2,182,300 | McCandless | Dec. 5, 1939 |
| 2,294,122 | McCandless | Aug. 25, 1942 |
| 2,415,086 | Detwiler | Feb. 4, 1947 |

FOREIGN PATENTS

| 662,160 | Germany | June 9, 1938 |